Sept. 9, 1947.   J. A. PIERSOL   2,427,157
LOW LIFT AIR LIFT
Filed Feb. 23, 1946
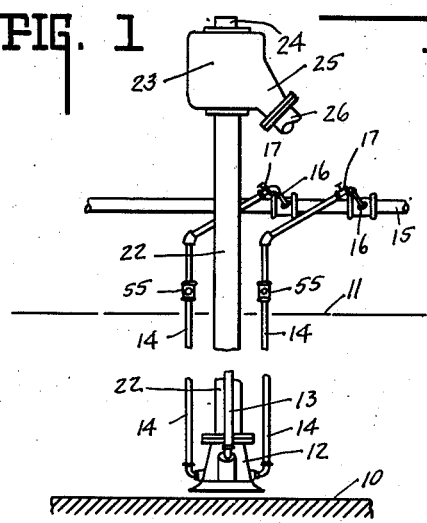
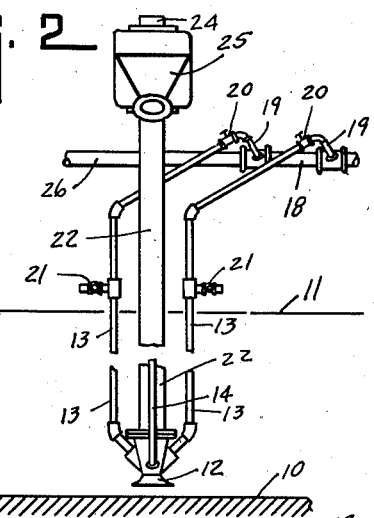
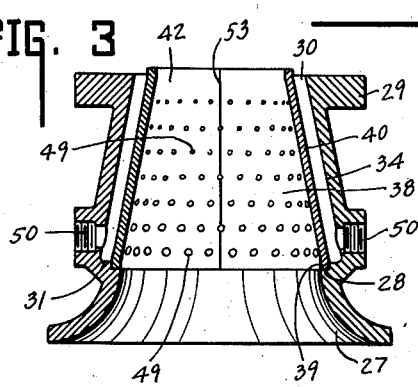
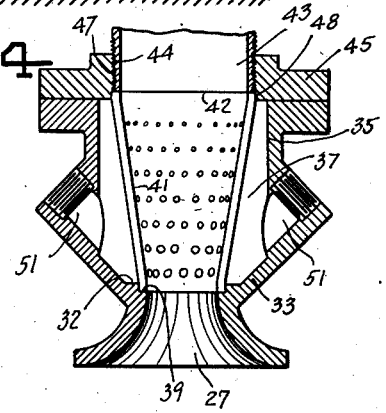
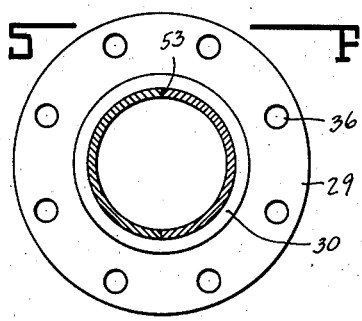
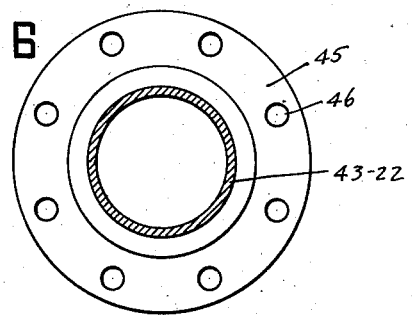
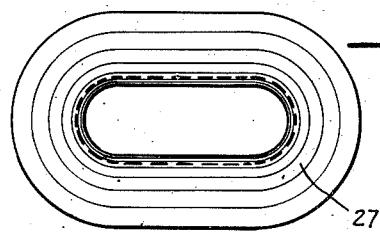
INVENTOR.
JOHN A. PIERSOL.
BY
Lockwood, Goldsmith & Galt,
ATTORNEYS.

Patented Sept. 9, 1947

2,427,157

UNITED STATES PATENT OFFICE 2,427,157

LOW LIFT AIR LIFT

John A. Piersol, Indianapolis, Ind.

Application February 23, 1946, Serial No. 649,532

17 Claims. (Cl. 103—232)

This invention relates to a low lift air lift structure.

Lift structures of this general type comprise the induction chamber, the lift tube and the eduction head. In such structures the chamber is where the lifting air and water (such as sewage) are mixed to lift the latter and the head is where the air and water (sewage) are separated after having been elevated, each to flow in its proper path.

The present invention is directed to the induction chamber and the control thereof.

The chief object of the present invention is to provide not only proper controls and balanced supplies of lifting air and wash water but a structural arrangement that has greater efficiency than conventional induction chambers, is simpler, more compact, is less liable to clog, is easier to clean and without dismantling, and assembled such that certain materials heretofore practically impossible to use are now capable of use therein.

The chief feature of the present invention resides in the parts comprised within the term induction chamber, the wash water and air supplies thereto and the control of the latter.

Other objects and features of the invention will be set forth more fully hereinafter.

The full nature of the invention will be understood from the accompanying drawings and the following description and claims.

In the drawings

Fig. 1 is a side elevation of an air lift structure embodying the invention, portions being broken away and tank bottom and liquid surface level being indicated by parallel lines.

Fig. 2 is an end view of the same.

Fig. 3 is a longitudinal central sectional view of the induction chamber structure with cap removed.

Fig. 4 is a central sectional view of the same with cap included and taken transverse to Fig. 3.

Fig. 5 is a top plan view of the parts shown in Fig. 3.

Fig. 6 is a top plan view of the parts shown in Fig. 4.

Fig. 7 is a bottom plan view.

In the treatment or handling of sewage same is supplied to a tank or the like and usually same has a predetermined level therein. In Figs. 1 and 2 10 indicates the tank bottom and 11 the aforesaid water level.

Near the tank bottom, and in suspended relation in the tank, is an induction chamber 12 having opposed water supplies 14 and alternated similarly opposed air supplies 13. Water header 15 includes take-offs 16 controlled by valves 17 and connected to water supplies 14.

An air header 18 includes take-offs 19 controlled by valves 20 and connected to air supplies 13. Each supply 13 above the normal water level 11, but in the tank, includes the valve controlled blow-off 21.

Extending upwardly from induction chamber 12 is lift tube 22, same terminating above the tank and at its upper end in an eduction head 23 having air outlet 24 and air lift discharge 25 to which pipe 26 is connected for sewage discharge.

Reference will now be had more particularly to Figs. 3 to 7 inclusive wherein the induction chamber details are more fully illustrated. Herein, see Figs. 3 to 5, the chamber includes a flared mouth or inlet 27 elliptical like in outline as shown. Inwardly of said bell mouth is an elliptical like outlined seat 28.

The opposite end of the induction chamber 12 includes flange 29 with a circular opening 30 therein. The interior of the induction chamber is enlarged outwardly as at 31 and 32 and the latter is further enlarged outwardly and upwardly at 33. From portion 31 the chamber wall is directed inwardly and upwardly at 34 and terminates in the circular opening 30. From the portion 33, the chamber wall is directed upwardly as at 35 and terminates in said circular opening 30. Walls 34 and 35 merge sidewardly. Flange 29 is suitably apertured at 36 for mounting purposes.

Within the induction chamber unit and enveloped by the air chamber 37 formed as aforesaid is a throat 38 or air screen unit. Herein same is illustrated as formed by two similar sections, although a single member or a greater number of sections may be utilized if desired. Same may be of plastic, glass, metal such as bronze, brass, aluminum, stainless steel or monel metal, or of ceramic material, vitrefied or otherwise.

Herein the lower end 39 conforms to elliptical-like seat 28 and extends upwardly and inwardly as at 40, see Fig. 3, and outwardly as at 41, see Fig. 4, same merging sidewardly and terminating in a circular outlined upper end 42 of lesser diameter than that of opening 30 in the casing and projecting slightly beyond the same as illustrated in said figures.

In alignment therewith is the lower end 43 of the lift tube 22 aforesaid and these need not necessarily contact for reasons self evident later, but herein same are shown in contact. The lower end 43 of said tube is externally threaded as at 44.

A cap 45 is apertured at 46 corresponding to the aperturing 36 in flange 29 of the casing. The cap is internally threaded at 47 for connection to the lower end of the lift tube. Coaxial with the threaded bore 47 is the laterally enlarged circular seat 48 of a size to just receive and locate the circular upper end 42 of the throat 38.

Note that threading 44 is of such length that the cap can be worked upwardly on the lift tube 22 an amount sufficient to unseat the end 42 to permit lateral displacement of the induction chamber for cleaning, repair and replacement purpose, if such chamber were provided with supporting feet and the like. The cap and flange are bolted together when the cap is threaded down on tube 22 sufficient to seat the end 42 of the throat in the seat 48.

When in detached relation the throat may be removed and replaced or cleaned and the air lift chamber may be cleaned if necessary. Throat 38 includes superposed peripheral series of peripherally spaced ports 49 and herein the size thereof progressively decreases from bottom to top of said throat.

Casing 12 is provided, near the bottom of the air chamber 37 and in alignment with the major axis of the elliptical-like throat formation, with longitudinally aligned ports 50 for opposed wash water supply by means of water supply lines 14 aforesaid.

Casing 12 is also provided with upwardly and outwardly directed substantially 90° positioned air supply ports 51 connectible to air pressure supply lines 13. In effect this is 45° positioning and head loss is reduced thereby. These ports 51 are disposed in alignment with the minor axis including plane of the elliptical-like formation for opposed air supply to the air chamber.

In normal operation the blow off valves 21 and wash water control valves 17 are closed and air control valves 20 are opened. Air entering the air chamber 37 discharges through ports 49 into the throat and rises in the lift tube carrying the tank liquid therewith. In the head 23, the air is separated from the liquid and the latter discharges for conveyance through pipe 26.

Periodically, or whenever discharge at 26 indicates a clogging condition, air valves 20 are closed and water valves 17 are opened. This forces, since line 15 is a pressure line, wash water through chamber 37 and orifices 49 to clear and clean said chamber and ports. In this washing one of the valves 21 may be closed and one remain open or vice versa for selective or alternate washing. During this washing action air may be admitted from either one or both air lines controlled by valves 20 to assist in the cleansing action.

Following washing to purpose the unit for service both wash water valves 17 are closed and both air control valves 20 are opened forcing all wash water trapped in air lines 13 and casing 37 out through the throat orifice.

As an alternate method of placing in service after wash water valves 17 have been closed either air control valve 20 may be opened and the blow off valve 21 in the other air supply line opened. Then all water and refuse trapped in the air lines 13 and casing 37 may be blown out through open blow off valve 21 resulting in additional cleaning action. This action may be alternated. After open blow off valves have been closed and air control valves opened the unit is again in operation.

Since the throat 38 is ported it will be obvious that if the same be sectionalized and the sections substantially abut at 53, operation of the structure is normal for section leakage is not material. Note that the only access air has to the lift tube from the air chamber is through said throat for cap 45 closes the casing. The form of the throat is such that any transverse section has an included area substantially equal to the area at any other parallel section.

This throat provides maximum air entrance peripherally and no restrictions to reduce pressure heads in the throat and compactness so that the resulting low height casing can be submerged to an effective greater depth and the maximum air supply possible to the throat is effected.

The balanced air supply and its peripheral discharge into the throat insures maximum air penetration into the liquid column in the throat and at high velocities. The elliptical-like bell mouth has a greater periphery than an equivalent circular periphery.

For equivalent quantities of flow for any particular nominal size, the velocity across the edge of the perimeter is less than if the section were a true circle. This permits the use of a less length of skirt on the bell mouth for an equivalent entrance constant $(k)$, loss of head $(h)$, $$h = k \frac{v2}{2g}$$

and also makes possible the placing of the bell mouth at a less vertical distance above the floor of the tank from which liquid is being pumped and still giving the same velocity between bell mouth and floor. This all results in a possible installation where the percentage of submergence can be increased for any depth of tank, resulting in a direct increase in efficiency and an increased discharge for the same quantity of air.

The oblong bell mouth can be located closer to the bottom of the tank than the circular type and still have the same velocity of flow across the edge of the bell, thus limiting the size of objects entering the bell to a smaller size than those for a circular bell at a like velocity of flow. The bell mouth can be located at a distance above the bottom of the tank so that any object entering the induction chamber will be of a size which can freely pass through the induction chamber, the lift tube above, and also flow through a suitable eduction head at the top of the lift tube. Frequently the material to be pumped is stringy or consists of elongated shapes of solids. The shape of the bell mouth is such that these particles will be better directed through the induction chamber and into the lift tube end, resulting in better handling of such type of materials without frequent cleaning. The ports of the induction chamber are such that all joints can be machined and be made small and uniform and with no projecting edges to catch strings, sticks and miscellaneous solids that normally cling to the fittings and rough edges in the usual pipe installations, particularly those with threaded connections.

When any air lift is shut down and left out of service for even a short period of time, the air is absorbed by the liquid or leaks from the air chamber and this space is occupied by liquid when the chamber is submerged. Small particles of solids of various size and shape, if present in the liquid, are thus carried into the air chamber. When the air is again turned on, many of the particles do not align themselves in a manner so they can pass out through the holes in the throat screen by which they may have entered. These particles gradually collect in the air chamber and make a washing-out necessary.

In conventional air lifts with one water connection near the top of the air chamber, high pressure water applied for a considerable length of time will assist in removing a portion of these solids, but will never make the chamber entirely clean. This necessitates tearing down, which is a laborious task, and cleaning out by hand and re-assembling. In the present invention this is materially reduced and when required is easily effected. The high pressure water, creating high velocity through the entrance ports strikes the rounded and inclined surface of the throat and is directed around the sides thereof and to the top of the air chamber and against the entire surface of the throat to wash clean all surfaces of both throat and chamber. The solids washed from the sides of the chamber and the surface of the throat collect at the bottom of the air chamber due to gravity. The wash water induced at high pressures creating high velocities will pick up all solids and carry same in suspension through any open vent on an air supply line or lines or a water supply line.

Also a condition of operation with one vent open, it would be possible to keep the vent in the other air supply line closed and, if desired, turn on a supply of air which, if of sufficient pressure, would pass into the air chamber, mix with the washing water, make possible a better cleaning job, and pass through the opposite air supply line to the outside mixed with the wash water, which can be applied or turned off at option. It also will be noted that either one or the other of the wash water inlets may be operated at a time, or that they may be operated alternately, and they can be combined with the use of air or not, at the option of the operator, making it thus possible to thoroughly clean the inside of the air chamber without dismantling except at exceptionally long intervals.

The induction chamber casing can be constructed of cast metal, or other similar material which will be rugged, and the probable conditions of operation are such that the usual amount of corrosion in the casing will have little effect on the operation of the equipment. The cap is usually made of the material of which the casing is made. It will be noted that the bell mouth is made an integral part of the casing, thus eliminating all machine work and some assembling cost. The throat or air screen as stated is made in two parts which can be cast or forged, and it can be punched or drilled either before or after shaping. Since the air inlet holes are perpendicular to the surface, if the throat is made from a stamping the holes can be gang punched before shaping.

Whenever desired the water supply lines may be provided with valve controlled blow-offs 55.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A low lift air lift structure suitable for elevation of sewage sludge and like liquids comprising an outer casing, a throat means therein and forming therein a central passage and an enveloping air chamber, the throat means having apertures, the casing having a flared inlet at its lower end and a throat means seat adjacent thereto for throat means lower end accommodation, a discharge conduit above the throat means, aligned therewith and having facial operative contact therewith, and cap means for the chamber having threaded connection with the conduit, said cap means being recessed to seat the upper end of the throat means, and means for supply of compressed air to the chamber.

2. A lift structure as defined by claim 1 wherein the throat means is of longitudinally sectionalized character, the sections being retained in tubular formation at opposite ends by the cap and casing seats.

3. A lift structure as defined by claim 1 wherein the apertures of the throat means are arranged entirely about the same and are of progressively diminishing size from bottom to top of the throat means.

4. A lift structure as defined by claim 1 wherein the apertures of the throat means are arranged in superposed layers and of the same size in the same layer and entirely about the throat means, the apertures in successive layers being of progressively diminishing size from bottom to top of the throat means.

5. A lift structure as defined by claim 1 wherein the means supplying compressed air to the chamber introduces the air at the bottom thereof and in opposed relation.

6. A lift structure as defined by claim 1 wherein means is provided to introduce a pressure wash liquid to the chamber at the bottom thereof and in opposed relation.

7. A lift structure as defined by claim 1 wherein means is provided to introduce a pressure wash liquid to the chamber at the bottom thereof and in opposed relation and the air supply means similarly introduces compressed air to the chamber, the said two means being alternated.

8. A lift structure as defined by claim 1 wherein the air supply means introduces compressed air to the chamber at the bottom thereof and in opposed relation and at an angle to the directional flow through the throat means and in opposition thereto.

9. A lift structure as defined by claim 1 wherein means is provided to introduce a pressure wash liquid to the chamber at the bottom thereof and in opposed relation and substantially transverse to the directional flow through the throat means.

10. A low lift air lift structure for elevation of sewage sludge and like liquids comprising an outer casing, an apertured throat means therein forming therewith an air chamber, the throat means having apertures, the aperture size decreasing in ascending relation, wash supply means to the lower end of the chamber, the throat means at its upper end having a substantially circular outline and at its lower end a substantially elliptical-like outline, each cross-sectional area of the throat means interior being approximately equal to that of any other, opposite wall elements in the major axis plane of the throat means converging upwardly and opposite wall elements in the minor axis plane of the throat diverging upwardly, and means for supplying compressed air to the chamber.

11. A lift structure as defined by claim 10 wherein the wash supply means is substantially coincident with the major axis plane and the air supply means is substantially coincident with the minor axis plane.

12. A lift structure as defined by claim 10 wherein the wash supply means and the air supply means is alternated.

13. A lift structure as defined by claim 10 wherein the wash supply means is substantially coincident with the major axis plane and the air supply means is substantially coincident with the minor axis plane, each of the said means being of dual character and discharging in opposition and to the chamber for balanced flow.

14. A low lift air lift structure for elevation of sewage sludge and like liquids comprising an outer casing, an apertured throat means therein forming therewith an air chamber, wash water supply means at opposite sides of the chamber and at the bottom thereof, means for supplying compressed air at opposite sides of the chamber and at the bottom thereof, a valve for each wash supply means, a vent for each wash water supply, a valve for each vent, and a valve for each compressed air supply means, the first and third mentioned valves being differentially controlled for normal and washing operations, the second and third mentioned valves being differentially controlled for chamber residual wash water discharge following washing, the second mentioned valve being closable for normal lift operation.

15. A lift structure as defined by claim 14 wherein at least one of the air supply lines includes a vent and a normally closed valve controlling said vent, opened only when the chamber is subject to washing pressure.

16. A lift structure as defined by claim 14 wherein each of the air supply lines includes a vent and a normally closed valve controlling said vent.

17. A lift structure as defined by claim 14 wherein each of the air supply lines includes a vent and a normally closed valve controlling said vent and selectively and simultaneously operable when desired and when the chamber is subject to washing pressure.

JOHN A. PIERSOL.

REFERENCES CITED

The following references are of record in the file of this patent:

UNITED STATES PATENTS

| Number | Name | Date |
| --- | --- | --- |
| 233,499 | Frizell | Oct. 19, 1880 |
| 284,962 | Huston | Sept. 11, 1883 |
| 562,266 | Young et al. | June 16, 1896 |
| 1,276,506 | Edwards | Aug. 20, 1918 |
| 1,361,196 | Stirling | Dec. 7, 1920 |